United States Patent [19]

Takano et al.

[11] Patent Number: 4,899,843

[45] Date of Patent: Feb. 13, 1990

[54] CENTER MEMBER STRUCTURE FOR MOTOR VEHICLE

[75] Inventors: Masamitsu Takano, Fujinomiya; Takanobu Ide, Isehara, both of Japan

[73] Assignees: Nissan Motor Co., Ltd., Yokohama; Yamakawa Industrial Co., Ltd., Fuji, both of Japan

[21] Appl. No.: 199,345

[22] Filed: May 26, 1988

[30] Foreign Application Priority Data

Jul. 17, 1987 [JP] Japan ................................. 62-177085

[51] Int. Cl.⁴ ............................................... B60K 5/12
[52] U.S. Cl. ...................................... 180/312; 296/194
[58] Field of Search ................ 296/194, 187, 188, 185, 296/203; 180/312

[56] References Cited

U.S. PATENT DOCUMENTS 4,047,730 9/1977 Panoz .................................. 180/312

4,753,315 6/1988 Fujisaki et al. ..................... 296/194

FOREIGN PATENT DOCUMENTS 90213 6/1982 Japan .
704368 2/1954 United Kingdom .

Primary Examiner—Robert R. Song
Attorney, Agent, or Firm—Foley & Lardner, Schwartz, Jeffery, Schwaab, Mack, Blumenthal & Evans

[57] ABSTRACT

A center member structure for use in a motor vehicle is disclosed which is designed to support thereon an engine unit. The center member structure comprises two pipe members arranged side by side and having first portions which extend in parallel and second portions which gradually separate from each other with increase of the distance from generally middle portions of the pipe members; and reinforcing plates welded to given portions of the pipe members to tightly combine the pipe members into a robust unit.

28 Claims, 6 Drawing Sheets

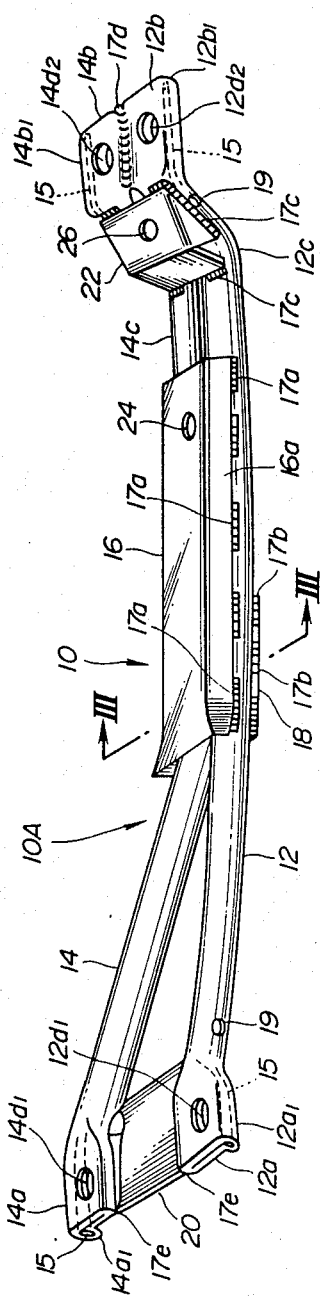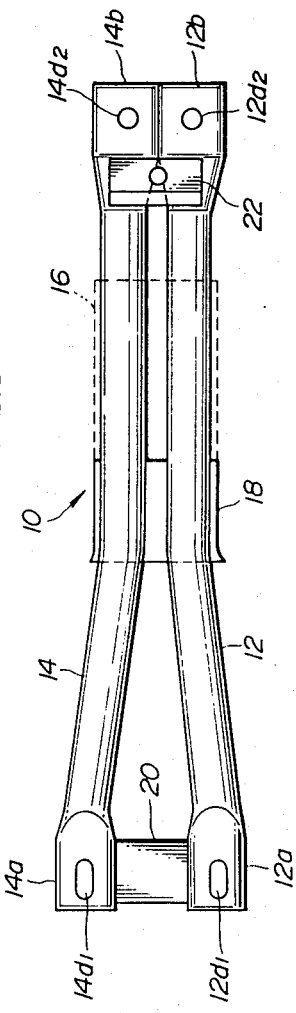

CENTER MEMBER STRUCTURE FOR MOTOR VEHICLE

BACKGROUND OF THE INVENTION

1. Field of the Invention

The present invention relates in general to a support structure installed in a motor vehicle, and more particularly to a center member structure designed to carry thereon an engine unit of the motor vehicle.

2. Description of the Prior Art

Many of the modern motor vehicles are of a frameless type. In the vehicles of such type, a center member structure is commonly employed which is designed to carry the engine unit thereon. Usually, the center member structure extends along the longitudinal axis of the vehicle and has both ends secured to axially spaced portions of a body of the vehicle respectively. In order to carry thereon the heavy engine unit, very high strength is required by the center member structure.

One of the conventional center member structures is shown in FIGS. 17 and 18 of the accompanying drawings. The structure comprises a longitudinally curved channel member 2 and a longitudinally curved plate member 4 which are spot-welded to constitute a longitudinally curved hollow structure. A reinforcing member 6 is attached to the inner surface of the channel member 2 to increase the mechanical strength of the structure. Numerals 5 denote the portions to which the spot welding is practically applied.

However, the center member structure of such conventional type has the following several drawbacks due to its inherent construction.

First, since the parts, viz., the channel member 2 and the plate member 4, of the structure are of a fair-sized pressed member, large-sized and thus expensive press machines are necessary.

Second, since a considerably large area of the structure needs to be welded to obtain a robust construction, the welding process requires a long time and thus correspondingly increases the production cost of the structure.

Third, it is difficult to accommodate the design change of the parts of the structure because of using large-sized press machines. In fact, any design change of the parts requires preparation of a new mold or molds which are expensive. Thus, hitherto, it has sometimes occurred that overstrengthened parts are employed for a center member structure to which only a small load is applied in practical use. This is wasteful.

Fourth, it has sometimes occured that the mutually contacting portions of the members 2 and 4 are painted poorly because of the numerous portions to which the welding is applied.

Fifth, as is understood from FIG. 19, when a large lead is applied to the center member structure, for instance at the time the motor vehicle is jacked up, the contacting portions 7 of the members 2 and 4 tend to separate thereby affecting the resiliency and rigidity of the center member structure.

SUMMARY OF THE INVENTION

Therefore, it is an essential object of the present invention to provide a center member structure which is free of the above-mentioned drawbacks.

According to the present invention, there is provided a center member structure which comprises two pipe members which are arranged side by side and joined together.

According to the present invention, there is provided a center member structure for use in a motor vehicle to support thereon an engine unit, the structure comprising two pipe members arranged side by side and having first portions which extend in parallel and second portions which gradually separate from each other with increase of distance from the generally middle portions of the pipe members, and reinforcing plates welded to given portions of the two pipe members to securely combine the pipe members into a robust unit.

BRIEF DESCRIPTION OF THE DRAWINGS

FIG. 1 is a perspective view of a center member structure of a first embodiment of the present invention;

FIG. 2 is a plan view of the structure of the first embodiment with an upper reinforcing cover plate removed;

DETAILED DESCRIPTION OF THE PREFERRED EMBODIMENTS OF THE INVENTION

Figure 3:
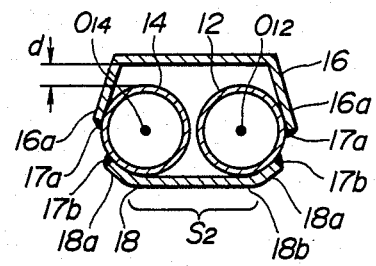
FIG. 3 is a sectional view taken along the line III—III of FIG. 1.

Referring to FIGS. 1, 2 and 3, particularly FIG. 1, there is shown a center member structure of a first embodiment of the present invention, which is generally designated by numeral 10.

As is best understood from FIG. 1, the center member structure 10 comprises generally a center member proper 10A which is constructed of two identical steel pipes 12 and 14, and upper and lower reinforcing cover plates 16 and 18 which are secured to the pipes 12 and 14 to join the same together.

Each pipe 12 or 14 is longitudinally curved, bow-like and has a circular cross section as shown in FIG. 3. As is seen from FIG. 1, the two pipes 12 and 14 are arranged side by side and they have right parts, as viewed in the drawing, extending in parallel and left parts gradually separating from each other with increase of distance from the middle portions thereof.

The upper reinforcing cover plate 16 is longer than the lower one 18. Each cover plate 16 or 18 has inclined side walls 16a or 18a (see FIG. 3). These cover plates 16 and 18 are arranged above and below the pipes 14 and 16 to put therebetween the parallel extending portions of the pipes 12 and 14 and welded thereto at the edges of the side walls 16a and 18a to join the two pipes 12 and 14 tightly together. Preferably, intermittent arc-welding is employed for the connection between each cover plate 16 or 18 and each pipe 12 or 14. The welded portions are denoted by numerals 17a and 17b. As is seen from FIGS. 1 and 2, front (viz., left as viewed in the drawings) ends of the side walls 16a or 18a of each cover plate 16 or 18 is curved outwardly to accommodate the left parts of the pipes 12 and 14.

As is seen from FIG. 3, the lower cover plate 18 is in contact with the lower surfaces of the pipes 12 and 14 so that an exposed (viz., lower) surface of the cover plate 18 serves as a so-called "jack up zone" against which a jack-up tool abuts of an associated motor vehicle when it is jacked-up. The upper cover plate 16 is arranged to leave a given space "d" between a major portion thereof and the upper portion of each pipe 12 or 14. Thus, the upper and lower cover plates 16 and 18 function not only to join the pipes 12 and 14 together but also increase the modulus of a section of the center member structure 10. Increasing the modulus of section is important to bear the great bending moment which is applied to the structure 10 upon jacking-up of the vehicle. It is to be noted that the width (viz., the height) of each side wall 16a of the upper cover plate 16 has a relationship with the mechanical strength of the structure 10. That is, the strength is increased with increase of the height of each side wall 16a.

Figure 8:
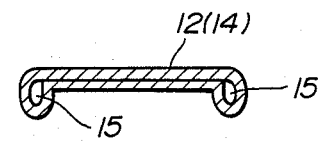
FIG. 8 is a sectional view of an end portion of a modified center member structure.

Referring back to FIG. 1, both ends 12a and 12b (or, 14a and 14b) of each pipe 12 or 14 are pressed flat except outer side edges $12a_1$ and $12b_1$ (or, $14a_1$ and $14b_1$) thereof. As is seen from this drawing, each side edge defines therein a small passage 15 which is communicated with the interior of the pipe 12 or 14. Upon electrodeposition painting of the structure 10, the paint liquid is permitted to flow into the interiors of the pipes 12 and 14 through the passages 15. Thus, the inner surfaces of the pipes 12 and 14 are well painted. If desired, as is seen from FIG. 8, the passages 15 and 15 may be formed at both side edges of the pressed end of each pipe 12 or 14. In order to assure the painting in the pipes 12 and 14, there are formed near the ends 12a, 12b, 14a and 14b thereof small openings 19. Of course, these openings 19 may be omitted if a satisfied painting is achieved with only the passages 15.

As is best seen from FIG. 1, the mutually spaced left ends 12a and 14a of the pipes 12 and 14 are welded to a common bracket 20, while, the right ends 12b and 14b of the same are welded directly to each other. Numerals 17c, 17d and 17e denote the portions to which the welding is applied. The parallel extending portions of the pipes 12 and 14 have near the right ends 12b and 14b curved portions 12c and 14c to which an obtusely bent bracket 22 is welded at the peripheral edges thereof. The upper cover plate 16 and the bracket 22 are respectively formed with bolt holes 24 and 26. As is seen from FIG. 5, an engine mount 38 is tightly disposed on the center member structure 10 in a manner as will be described in detail hereinafter.

As is understood from FIG. 1, both ends 12a and 12b (or, 14a and 14b) of each pipe 12 or 14 are formed with bolt holes $12d_1$ and $12d_2$ (or, $14d_1$ and $14d_2$). As is seen from FIG. 5, upon mounting to a vehicle body, the front ends 12a and 14a of the joined pipes 12 and 14 are attached to a lower surface of a front cross member 31 and secured thereto by using bolts 32a and nuts 32b, and the rear ends 12b and 14b of the same are attached to a lower surface of a dash panel 33 and secured thereby by using bolts 32a and nuts 32b.

Figure 7:
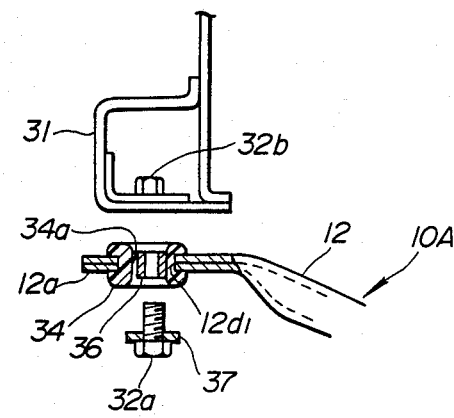
FIG. 7 is a sectional view of a front part of the center member structure illustrating how it is fixed to a motor vehicle body by a bolt.

FIG. 7 shows in detail the manner in which the front end 12a or 14a of each pipe 12 or 14 is secured to the front cross member 31. The bolt hole $12d_1$ or $14d_1$ of the pipe end 12a or 14a is a longitudinally extending slot which is equipped with a rubber bushing 34. Within an elongate opening 34a thus defined by the rubber bushing 34, there is slidably received a cylindrical spacer 36. The nut 32b is welded to the front cross member 31. Upon assembly, the bolt 32a is passed through the spacer 36 in the rubber bushing 34 and screwed into the nut 32b of the cross member 31. Denoted by numeral 37 is a washer for the bolt 32a. Due to the provision of the rubber bushings 34, there is an elastic connection between the front end 12a or 14a of each pipe 12 or 14 and the front cross member 31. Due to the shape of the elongate openings $12d_1$ and $14d_1$, a longitudinal but small displacement of the front ends 12a and 14a of the joined pipes 12 and 14 is permitted relative to the vehicle body.

As is seen from FIG. 1, the bolt hole $12d_2$ or $14d_2$ of the pipe right end 12b or 14b is a circular opening. Although not shown in the drawings, the right ends 12b and 14b are secured to the dash panel 33 in substantially the same manner as in the case of the front ends 12a and 14a. That is, the connection between the rear end 12b or 14b of each pipe 12 or 14 and the dash panel 33 is elastically made due to provision of a rubber bushes disposed therebetween. Thus, any vibration applied to the center member structure 10 is damped to a certain extent by the rubber bushings.

Figure 5:
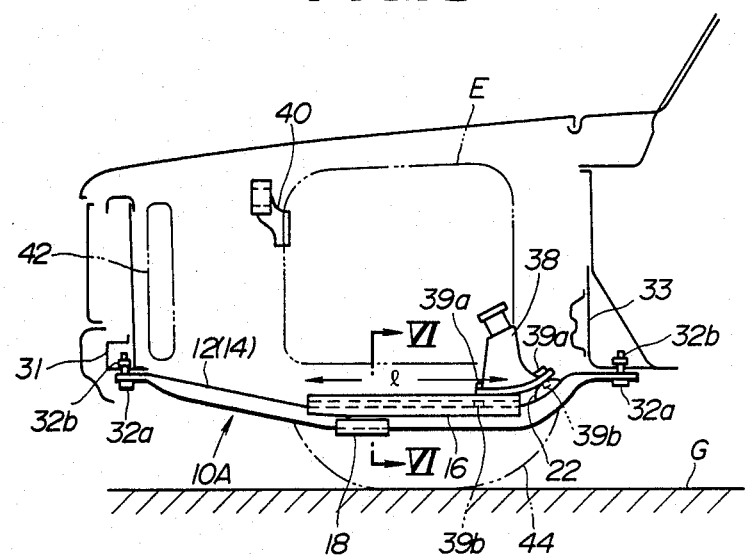
FIG. 5 is an illustration of a front portion of a motor vehicle, to which the center member structure of the invention is mounted in practice.
Figure 6:
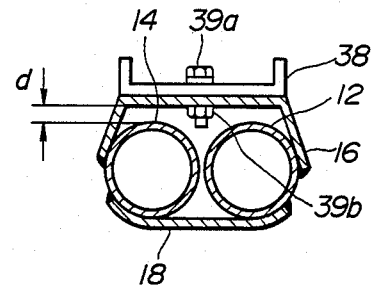
FIG. 6 is a sectional, but enlarged, view taken along the line VI—VI of FIG. 5.

As is seen from FIG. 5, the engine mount 38 is secured to both a rear end portion of the upper reinforcing cover plate 16 and the obtusely bent bracket 22 by means of bolts 39a and nuts 39b. A pair of upper engine mounts 40 (only one is shown) are secured to respective brackets (not shown) which are secured to laterally spaced portions of the vehicle body. As is seen from FIG. 6, the space "d" defined between the upper cover plate 16 and the two joined pipes 12 and 14 is sized to neatly accommodate the nut 39b for the bolt 39a by which the engine mount 38 is fixed to the upper cover plate 16. As is known, the engine mounts 38, 40 and 40 are equipped with rubber insulators, so that the engine unit "E" is resiliently supported by them. Designated by numerals 42 and 44 are a radiator and a front tire of the vehicle. Reference "G" denotes a surface of the road.

Since the upper cover plate 16 to which the engine mount 38 is secured has a configulation extending along the longitudinal axes of the two joined pipes 12 and 14, the weight of the engine unit "E" and the engine mount 38 is evenly supported by a relatively large area of the center member structure 10. Thus, a bending moment applied to the zone designated by "1" is reduced thereby improving the durability of the structure 10.

The following are advantages of the center member structure 10.

Figure 17:
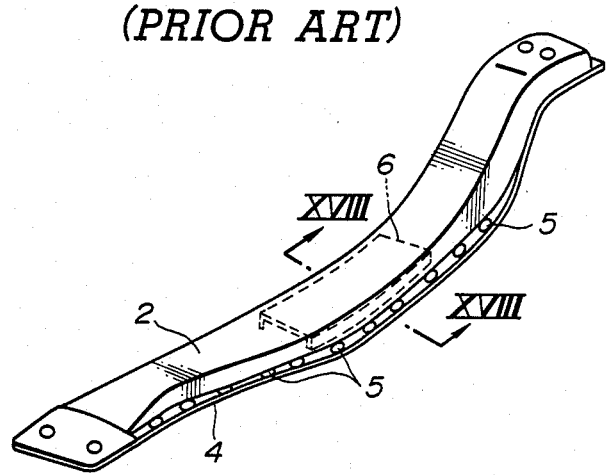
FIG. 17 is a perspective view of a conventional center member structure.
Figure 18:
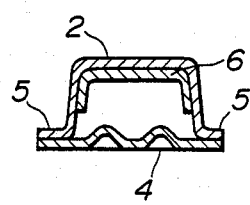
FIG. 18 is a sectional view taken along the line XVIII—XVIII of FIG. 17.
Figure 19:
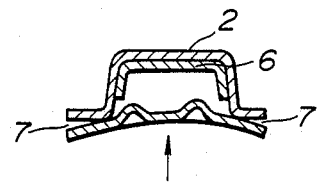
FIG. 19 is a view similar to FIG. 18, but showing a condition wherein the structure is deformed.

First, since the structure 10 is constructed of two pipes 12 and 14 joined together by the upper and lower reinforcing cover plates 16 and 18, it can bear a great load even when the diameter and thickness of the pipes are not large. Thus, unlike the case of the aforementioned conventional center member structure of FIGS. 17 and 18, large-sized and thus expensive press machines are not necessary. Usage of such small sized pipes facilitates design change of the structure 10.

Figure 4:
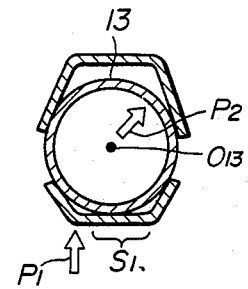
FIG. 4 is a sectional view similar to FIG. 3, but showing a case wherein only one pipe member is employed for a center member structure, which view is provided for stressing an advantageous feature of the first embodiment.

Second, because of the same reason as mentioned hereinabove, a larger jack up zone can be provided by the structure 10. This will be apparent when compared with a structure of FIG. 4 wherein only one but larger pipe 13 is used to provide the structure with a mechanical strength substantially equal to that of the invention. That is, if, upon jacking up of an associated vehicle, the jack up point "$P_1$" is somewhat displaced from a desired center position of the jack-up zone "$S_1$", a considerable bending moment "$P_2$" is produced in the pipe 13. That is, the jack-up zone "$S_1$" is limited to the restricted center portion coincident with the longitudinal axis "$O_{13}$" of the pipe 13. Due to the provision of the two pipes 12 and 14 arranged abreast, the structure 10 of the invention can provide a sufficiently large jack up zone "$S_2$" which is bounded by the longitudinal axes "$O_{12}$" and "$O_{14}$" of the pipes 12 and 14. In addition, the larger jack up zone can minimize damage of the center member structure 10 which may be inflicted when the same collides against the road surface as the vehicle travels.

Third, the center member structure 10 is constructed of smaller diameter pipes which are easily produced.

Fourth, because of use of the smaller diameter pipes 12 and 14, the center member structure 10 can be produced with a reduced thickness. This results in an increase in distance between the center member structure 10 mounted to the vehicle body and a road surface.

Fifth, because the structure 10 has a simple and smoothed configuration, application of paint thereto is easily achieved.

Sixth, because the two pipes 12 and 14 are tightly joined together by the four reinforcing members (viz., the upper and lower cover plates 16 and 18 and the front and rear 20 and 22) which are welded thereto, the structure has a quite strong construction.

Seventh, because the upper reinforcing cover plate 16 is arranged above the pipes 12 and 14 leaving a given space "d" therebetween, the space "d" can be used to neatly receiving the nut 39b for the bolt 39a by which the engine mount 38 is fixed to the upper cover plate 16.

Figure 9:
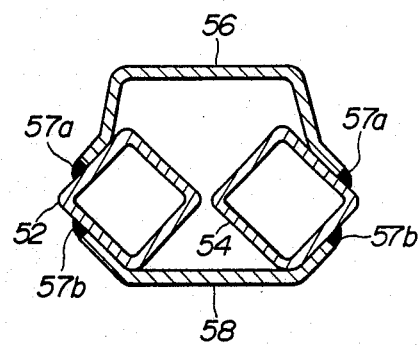
FIGS. 9, 10, 11 and 12 are sectional views similar to FIG. 3, but showing second, third, fourth and fifth embodiments of the present invention.
Figure 10:
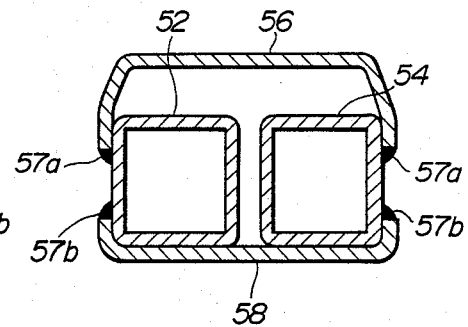

Referring to FIGS. 9 and 10, there are shown second and third embodiments of the present invention wherein two rectangular cross section pipes 52 and 54, an upper reinforcing cover plate 56 and a lower reinforcing cover plate 58 are assembled in substantially the same manner as mentioned in the description of the first embodiment 10. However, as is understood from the drawings, in the second embodiment, the pipes 52 and 54 are angularly raised relative to the lower cover plate 58, and in the third embodiment, the pipes 52 and 54 are stably laid on the plate 58. It is to be noted that numerals 57a and 57b denote the arc welded intermittent portions.

Figure 11:
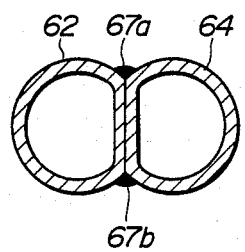
Figure 12:
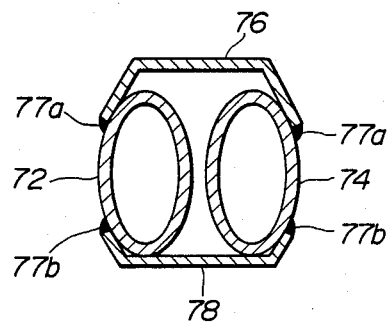

Referring to FIGS. 11 and 12, there are shown fourth and fifth embodiments of the present invention. In the fourth embodiment, two semicircular cross section pipes 62 and 64 are welded at their flat side portions, while in the fifth embodiment, two pipes 72 and 74 of oval cross section are used. Upper and lower reinforcing cover plates 76 and 78 are welded to the pipes 72 and 74 in the above-mentioned manner. It is to be noted that numerals 67a, 67b, 77a and 77b denote the arc welded portions.

Figure 13:
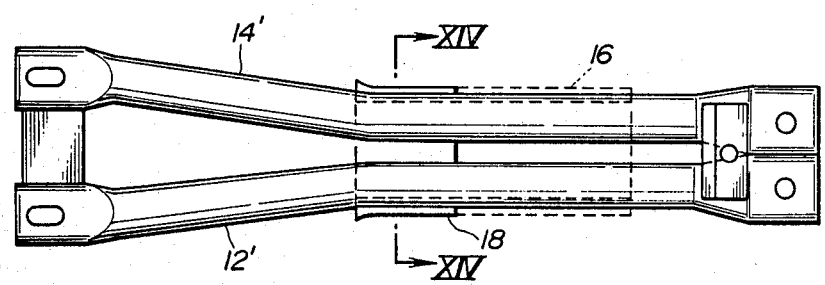
FIG. 13 is a plan view similar to FIG. 2, but showing a sixth embodiment of the present invention.
Figure 14:
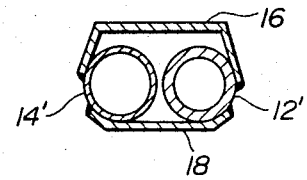
FIG. 14 is a sectional view taken along the line XIV—XIV of FIG. 13.

Referring to FIGS. 13 and 14, there is shown a sixth embodiment of the present invention. As shown, in this embodiment, the two pipes 12' and 14' are different in shape. That is, the pipe 12' is bent larger than the other 14', and the cylindrical wall of the pipe 12' is thicker than that of the other 14'. But, they are the same in outer diameter.

Figure 15:
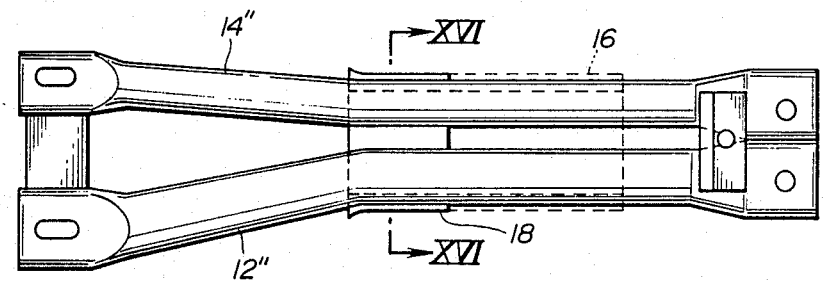
FIG. 15 is a plan view similar to FIG. 2, but showing a seventh embodiment of the present invention.
Figure 16:
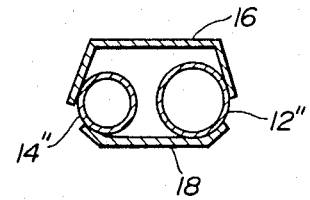
FIG. 16 is a sectional view taken along the line XVI—XVI of FIG. 15.

Referring to FIGS. 15 and 16, there is shown a seventh embodiment of the present invention. In this embodiment, two different pipes 12" and 14" are used for constituting a center member structure. That is, as is shown, the pipe 12" is bent more than the other pipe 14" and has a larger outer diameter than the other pipe 14". But, they are the same in thickness of the cylindrical wall. Upon mounting to the vehicle body, the center member structure of the sixth or the seventh embodiment is arranged offset with respect to the longitudinal axis of the vehicle body. That is, upon mounting, the center member structure is so arranged that the largely bent pipe 12' or 12" is located nearer the longitudinal axis than the other pipe 14' or 14". This is because upon jacking-up the associated motor vehicle, the load applied to the pipe 12' or 12" is greater than that applied to the other pipe 14' or 14".

What is claimed is:

1. A center member structure for use in a motor vehicle to support thereon an engine unit, comprising:
   two pipe members arranged side by side, said pipe members having first portions which extend in parallel and second portions which gradually separate from each other with increase of the distance from generally middle portions of the pipe members; and
   two longitudinally extending reinforcing plates welded to given portions of said pipe members to tightly combine the pipe members into a rubust unit.

2. A center member structure as claimed in claim 1, in which said pipe members are of a steel pipe.

3. A center member structure for use in a motor vehicle to support thereon an engine unit, comprising;
   two steel pipe members arranged side by side, said pipe members having first portions which extend in parallel and second portions which gradually separate from each other with increase of the distance from generally middle portions of the pipe members; and
   reinforcing plates welded to predetermined portions of said pipe members to tightly combine the pipe members into a robust unit;
   said reinforcing plates comprising:
   an upper reinforcing cover plate covering first given portions of said pipe members and welded to the same and a lower reinforcing cover plate covering second given portions of said pipe members and welded to the same, said upper and lower reinforcing cover plates being arranged so that the pipe members are therebetween.

4. A center member structure as claimed in claim 3, in which said first and second given portions are located at said first portions of the pipe members.

5. A center member structure as claimed in claim 4, in which said upper reinforcing cover plate extends along the longitudinal axes of the joined pipe members and has a size longer than that of said lower reinforcing cover plate.

6. A center member structure as claimed in claim 5, in which each of said upper and lower reinforcing cover plates includes a rectangular major portion and inclined side walls, the leading edges of said side walls being welded to said pipe members.

7. A center member structure as claimed in claim 6, in which the rectangular major portion of said upper reinforcing cover plate is spaced from said first given portions of said pipe members.

8. A center member structure as claimed in claim 7, in which said upper reinforcing cover plate has one end on which an engine mount is securely mounted.

9. A center member structure as claimed in claim 4, further comprising a front bracket to which the leading ends of said second portions of said pipe members are welded.

10. A center member structure as claimed in claim 9, in which the longitudinal both ends of each pipe member are pressed flat except outer edges thereof, each outer edge defining therein a small passage through which the interior of the pipe member is communicated with the outside of the pipe member.

11. A center member structure as claimed in claim 9, in which the longitudinal both ends of each pipe member is pressed flat except both side edges thereof, the side edges defining therein respective small passages through which the interior of the pipe member is communicated with the outside of the same.

12. A center member structure as claimed in claim 10, further comprising an obtusely bent bracket which is welded to said first given portions of the pipe members near the leading ends of the first given portions.

13. A center member structure as claimed in claim 4, in which each of the pipe members is smoothly curved like a bow.

14. A center member structure as claimed in claim 13, in which each of said pipe members is formed with at least one opening near one end thereof.

15. A center member structure as claimed in claim 4, in which each of said pipe members has a circuluar cross section.

16. A center member structure as claimed in claim 4, in which each of said pipe members has a rectangular cross section.

17. A center member structure as claimed in claim 4, in which each of said pipe member has an oval cross section.

18. A center member structure as claimed in claim 4, in which each of said pipe members has a semicircular cross section with a flat side potions, the two pipe members being welded to each other at the flat side portions.

19. A center member structure as claimed in claim 16, in which the rectangular cross section pipe members are angularly raised relative to said lower reinforcing cover plate.

20. A center member structure as claimed in claim 16, in which the rectangular cross section pipe members are stably laid on said lower reinforcing cover plate.

21. A center member structure as claimed in claim 4, in which the two pipe members are the same in construction.

22. A center member structure as claimed in claim 4, in which the two pipe members are different in shape.

23. A center member structure as claimed in claim 22, in which one of the pipe members is bent larger than the other.

24. A center member structure as claimed in claim 23, in which the wall thickness of the largerly bent pipe member is greater than that of the other, and in which the outer diameter of the largely bent pipe member is equal to that of the other.

25. A center member structure as claimed in claim 23, in which the outer diameter of said largely bent pipe member is greater than that of the other, and in which the wall thickness of the largely bent pipe member is equal to that of the other.

26. A center member structure as claimed in claim 8, in which front ends of the inclined side walls of each reinforcing cover plate are curved outwardly for accommodation to said second portions of the two pipe members.

27. A center member structure for use in a motor vehicle to support thereon an engine unit, comprising:
  two pipe members arranged side by side, said pipe members having first portions which extend in parallel and second portions which gradually separate from each other with increase of the distance from generally middle portions of the pipe members; and
  reinforcing plates welded to given portions of said pipe members to tightly combine the pipe members into a robust unit, each pipe member being formed with respective openings at its first and second ends, the openings being adapted to receive therethrough bolts for bolting said pipe member to the motor vehicle.

28. A center member structure for use in a motor vehicle to support thereon an engine unit, comprising:
  two pipe members arranged side by side, said pipe members having first portions which extend in parallel and second portions which gradually separate from each other with increase of the distance from generally middle portions of the pipe members; and
  reinforcing plates welded to given portions of said pipe members to tightly combine the pipe members into a robust unit,
  wherein said first portions have a cross section taken by an imaginary plane which perpendicularly crosses the longitudinal axes of said first portions, said cross section satisfying the following inequality:

$$A/2 \geqq B$$

wherein:
  A is the distance between outermost and innermost portions of one of said first portions, through which a horizontal line passes, and
  B is the distance between respective facing portions of said first portions.

* * * * *